UNITED STATES PATENT OFFICE.

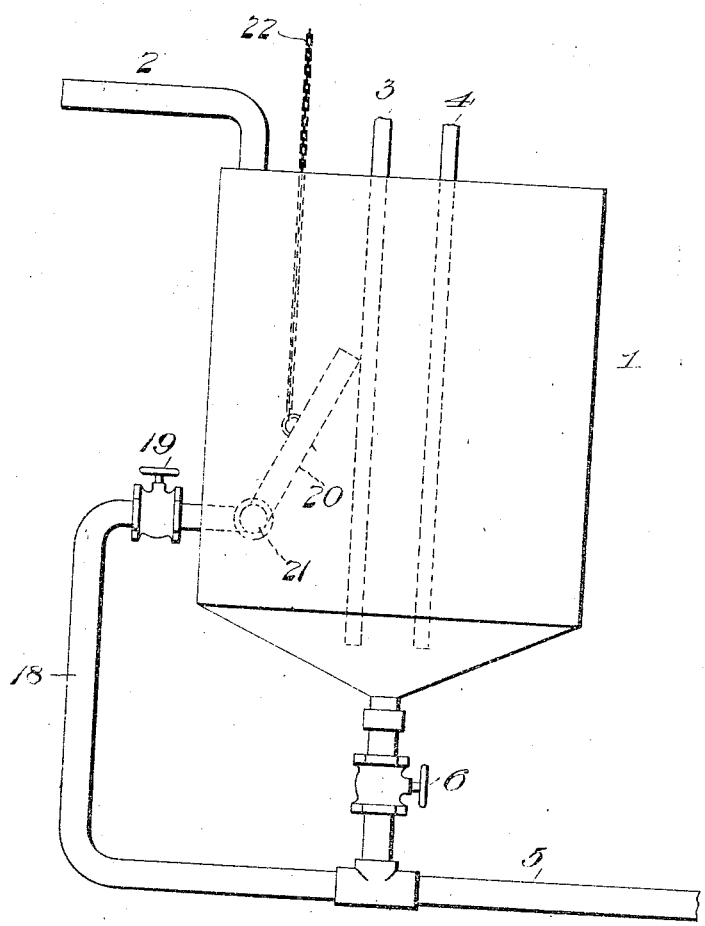

JOHN LATHROP GRAY, OF ELIZABETH, NEW JERSEY.

PROCESS OF SEPARATING ACID FROM PETROLEUM SLUDGE.

No. 923,429.　　　　Specification of Letters Patent.　　　Patented June 1, 1909.

Application filed June 24, 1905. Serial No. 266,765.

*To all whom it may concern:*

Be it known that I, JOHN LATHROP GRAY, a citizen of the United States, residing at Elizabeth, in the county of Union and State of New Jersey, have invented certain new and useful Improvements in Processes of Separating Acid from Petroleum Sludge; and I do hereby declare the following to be a full, clear, and exact description of the invention, such as will enable others skilled in the art to which it appertains to make and use the same.

My invention relates to a method of separating acid from petroleum sludge.

It is customary in the art to separate the acid from petroleum sludge by digesting the sludge with water and steam or water and air, or water, steam and air so that the separated and recovered acid is 40 degrees to 50 degrees gravity Baumé.

By additional digesting of the sludge, or by using more water and steam than is customary in the original treatment by washing the sludge with water and simultaneously agitating it by steam or air, no doubt more acid might be secured but it would be at a gravity too low to pay for reconcentrating for use.

My method consists essentially in digesting the petroleum sludge first with relatively weak acid, of approximately 15 degrees gravity, using sufficient of the acid so that it will absorb sufficient of the stronger acid of the sludge to raise the gravity and produce a body of separated acid which will show 40 or 50 degrees gravity Baumé, and even lower. I then digest a second time, using a relatively still weaker acid or water, until I have accumulated by absorption nearly all the remaining acid in the sludge. The acid separated by the first treatment is sufficiently strong to be recovered with economy, but the acid from the succeeding treatment is relatively too weak to be economically reconcentrated. I have discovered, however, that the acid from the second treatment serves as an effective first wash for the reason that a great deal of acid is destroyed by the chemical heat generated by using water for the first wash, this loss in acid being due to the combination of some of the hydro-carbons of the sludge with sulfur from the acid allowing the $SO_2$ radical from the acid to escape as worthless gas, and by using the weaker acid a relatively lower temperature is secured and less acid is destroyed and the hydro-carbons present are less injured for the further manufacture into asphalt.

Petroleum is composed of many and various hydro-carbons, some of which are unsaturated. In the treatment of petroleum when sulfuric acid is introduced it combines with these unsaturated hydro-carbons and separates them from the main body of the oil, the resulting "sludge" being really a combination of the unsaturated hydro-carbons, the sulfuric acid and a percentage of mechanically entrained oil. On settling, with or without heating, the mechanically entrained oil rises to the top, and I pump it off, leaving what may be termed a pure sludge.

In the accompanying drawing, illustrating a form of apparatus which may be used in carrying out this process 1 represents a separator tank. 2 represents a pipe through which the digesting medium, water or weak acid, may enter. 3 represents a steam line and 4 an air line, both of which lead into the separator tank and discharge at the bottom. An outlet pipe 5, valved at 6, leads from the bottom of the separator tank. Such an apparatus will constitute a separator for a single treatment. For the additional treatments to provide for removing another layer or grade from the top as well as from the bottom, I employ an adjunctive pipe device comprising a branch pipe 18 leading into a main pipe 5. The pipe 18 is valved at 19, and passes through, in the form illustrated, the side of the separator tank 1. Connecting with the pipe 18 is a swing section 20, having a joint at 21 and adapted to be operated either by hand or power through the medium of a chain 22. This swing joint section may be lifted up and down according to the height of the light grade or the top layer in the tank so that the top layer may be drawn off through its separator connection.

As an example of the mode of carrying out my process I may take 100 lbs. of an average sludge. To this I may add, through the pipe 2,100 lbs. of 15° Baumé gravity sulfuric acid. I then agitate for about one hour with steam or air, or both steam and air. I use the steam on heavy sludge and on the lighter grades I use either air or steam, or both. I then draw off 78 lbs. of 37½° Baumé acid and 20½ lbs. of a light grade of unsaturated hydro-carbons about the consistency of syrup. I then add 40 lbs. of water to the remaining sludge and agitate one hour with air or steam, or both. I then draw off 64 lbs. of about 17½° Baumé gravity acid, 2 lbs. of an intermediate grade of about the consistency of molasses, leaving 36 lbs. of a remaining heavy sludge. In ordinary practice in each case the mass will separate into layers, the relatively light grade of separated unsaturated hydro-carbons on top, the relatively heavy remaining sludge next and the acid at the bottom. I employ the weak acid resulting from this second digesting in the first digesting of succeeding operations.

In a companion application Serial No. 266,763, I have described and claimed a process of producing pitch or asphaltum either from the original body of sludge or from any of the grades into which, by a process described in another companion application, Serial No. 266,764, I may separate it. In carrying out the process of No. 266,763 I digest the acid sludge until the major part of the acid has been removed, then heat the mass beyond the condensing point of steam, and, finally digest the mass by a steam spray until it is converted into pitch.

In carrying out the process of No. 266,764, I digest the acid sludge until the mass separates into divisions of separated unsaturated hydro-carbons, weak acid, and a heavy residuum, the remaining "unseparated" sludge.

It will be apparent that I may employ effectively the process of this application No. 266,765, in carrying out the process of application No. 266,764 and as a preliminary step in carrying out the process of my application No. 266,763. In carrying out these processes the preceding pumping off of the mechanically entrained oil leaves only the sludge to be treated by the process of this application, and in the subsequent process of producing pitch or asphaltum, described and claimed in the aforesaid companion applications, prevents the presence of a combination of the entrained oil with any of the acid which might be formed under the high temperatures employed in carrying out the separating process or the pitch and asphaltum process.

My process of removing the acid from the sludge, therefore, results in securing a larger amount of acid than has hitherto been derived, and at the same time forms a valuable preliminary process to my above described invention for treating the petroleum sludge to secure pitch or asphaltum. For by my treatment in accordance with the process of this application I not only save a large part of the acid from the sludge, but by removing the acid I leave the sludge in a favorable condition for being treated by my process of securing pitch.

Having fully described my invention, what I claim is:—

1. The process of separating acid from sludge which consists in washing or digesting a sludge from which the major portion of the acid has been separated, and employing the accumulated acid of a succeeding washing or digesting to separate the acid from another body of sludge.

2. The process of separating acid from sludge in two washings or digestings in which the second weak acid separation is employed in the first washing or digesting of a succeeding body of sludge.

3. The process of separating acid from sludge which consists in washing or digesting the sludge with a weak acid solution.

In testimony whereof I affix my signature, in presence of two witnesses.

JOHN LATHROP GRAY.

Witnesses:
FRANK B. MASON,
THOMAS TARVIN GRAY.